(12) United States Patent
Iida et al.

(10) Patent No.: US 7,672,583 B2
(45) Date of Patent: Mar. 2, 2010

(54) CAMERA INCLUDING A SLIP-PROOF SECTION

(75) Inventors: Masami Iida, Tokyo (JP); Tatsuo Okuda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 672 days.

(21) Appl. No.: 11/496,586

(22) Filed: Aug. 1, 2006

(65) Prior Publication Data
US 2007/0076097 A1  Apr. 5, 2007

(30) Foreign Application Priority Data
Aug. 16, 2005  (JP) .............................. 2005-235682

(51) Int. Cl.
*G03B 17/02* (2006.01)

(52) U.S. Cl. .................. 396/535; 396/542; 348/374

(58) Field of Classification Search ................. 396/535, 396/540, 542; 348/207.99, 373, 374, 375, 348/376; D16/200, 206, 208, 209, 217
See application file for complete search history.

(56) References Cited

U.S. PATENT DOCUMENTS

| | | | |
|---|---|---|---|
| 4,857,948 A | | 8/1989 | Akabane et al. |
| 5,610,655 A | * | 3/1997 | Wakabayashi et al. ...... 348/373 |
| 5,878,284 A | * | 3/1999 | Takaba ........................... 396/6 |
| 7,206,136 B2 | * | 4/2007 | Labaziewicz et al. ....... 359/676 |
| 2002/0001474 A1 | * | 1/2002 | Horiguchi ................... 396/535 |
| 2006/0088315 A1 | * | 4/2006 | Kappali et al. .............. 396/535 |

FOREIGN PATENT DOCUMENTS

| | | |
|---|---|---|
| JP | 11-127370 | 5/1999 |
| JP | 2001-33866 | 2/2001 |
| JP | 2003-315885 | 11/2003 |
| JP | 2004-179850 | 6/2004 |

OTHER PUBLICATIONS

Shinwen MA, et al., "Colorful and cool Compact Digital Camera-RICOH Caplio RZ1", Pop Hard Magazine, May 28, 2005, pp. 77-78.

* cited by examiner

*Primary Examiner*—Christopher Mahoney
(74) *Attorney, Agent, or Firm*—Oblon, Spivak, McClelland, Maier & Neustadt, L.L.P.

(57) ABSTRACT

A camera includes a base section, and a grip section which is provided in at least one lateral end of the camera, bending to a rear side of the camera. The grip section is disposed with a slip-proof section adjacent to a zoom key which is longitudinally arranged. Additionally, a slip-proof section to prevent finger slipping is positioned on a back surface of the grip section.

10 Claims, 3 Drawing Sheets

CAMERA INCLUDING A SLIP-PROOF SECTION

This application claims priority benefit of Japanese Patent Application No. 2005-235682 filed on Aug. 16, 2005, the contents of which are incorporated herein by reference.

BACKGROUND OF THE INVENTION

1. Field of the Invention

The present invention relates to a camera having a body and particularly a camera to be gripped with good stability.

2. Description of Related Art

For a recent small sized and light weight camera which is called a compact digital camera, it is very common to dispose a zoom lens, a liquid crystal display and a shutter release button on a front surface, a back surface and an upper surface of a small solid rectangular body of the compact digital camera, respectively.

For the above mentioned compact digital camera with the solid rectangular body, in order to improve its operability and photographing manner suitability, there have been performed various designs disclosed for example on Japanese Patent Laid open Nos. 2001-033866, 2003-315885, 2004-179850 and H11-127370.

Recently, it is possible for the compact digital camera disclosed in the above documents to take a high quality image as a result of improved lens performance and increased pixel numbers of imaging elements. However, the more the pixel numbers are, the more remarkable deteriorations to the image quality caused by hand shaking of the camera would be apparently appeared.

Although the compact digital camera is expected to be of a smaller body size, while this makes it difficult to hold the camera. Furthermore, since the liquid crystal display for displaying images is desired to be larger, therefore a body panel section except the liquid crystal display in the back surface of the camera becomes further smaller.

The smaller the above mentioned body panel section except the liquid crystal display becomes, which makes the camera difficult to be gripped, the more likely the hand shaking of the camera happens.

SUMMARY OF THE INVENTION

It is therefore an object of the present invention to provide a camera to be gripped with good stability despite its small size and simple design.

To achieve the above mentioned object according to the present invention, there is provided a camera comprises a body including a base section and a grip section provided on at least one lateral end of the base section, wherein the grip section is bent backward to the camera.

DETAILED DESCRIPTION OF THE PREFFERED EMBODIMENTS

A preferred embodiment for carrying out the invention will be described below with reference to the drawings.

A camera according to the embodiment is a digital camera or a compact digital camera mounted with an optical zoom lens, in which image signals are converted by a CCD (charge-coupled device) imaging element into electronic signals which are digitalized to obtain digital data of a still image or a video picture for a subject and the digital data are then stored in a memory card.

Figure 1:
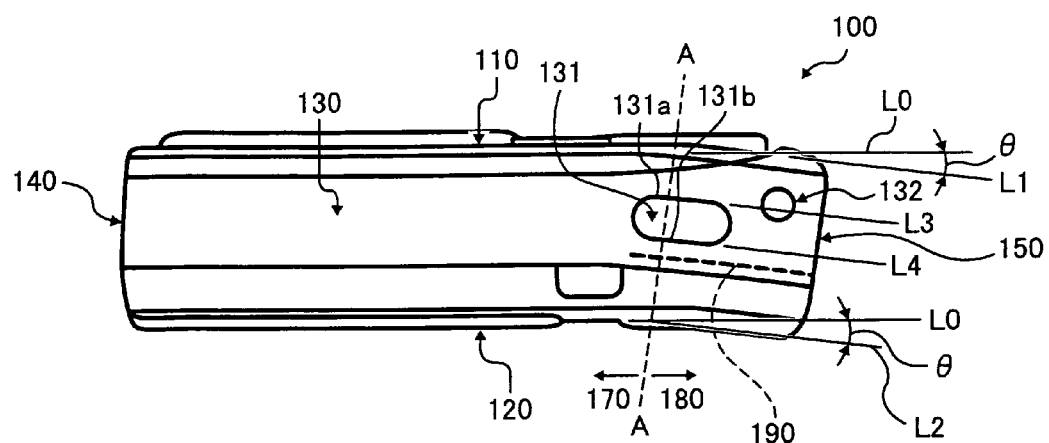
FIG. 1 is a plan view of a camera according to a preferred embodiment of the present invention.
Figure 2:
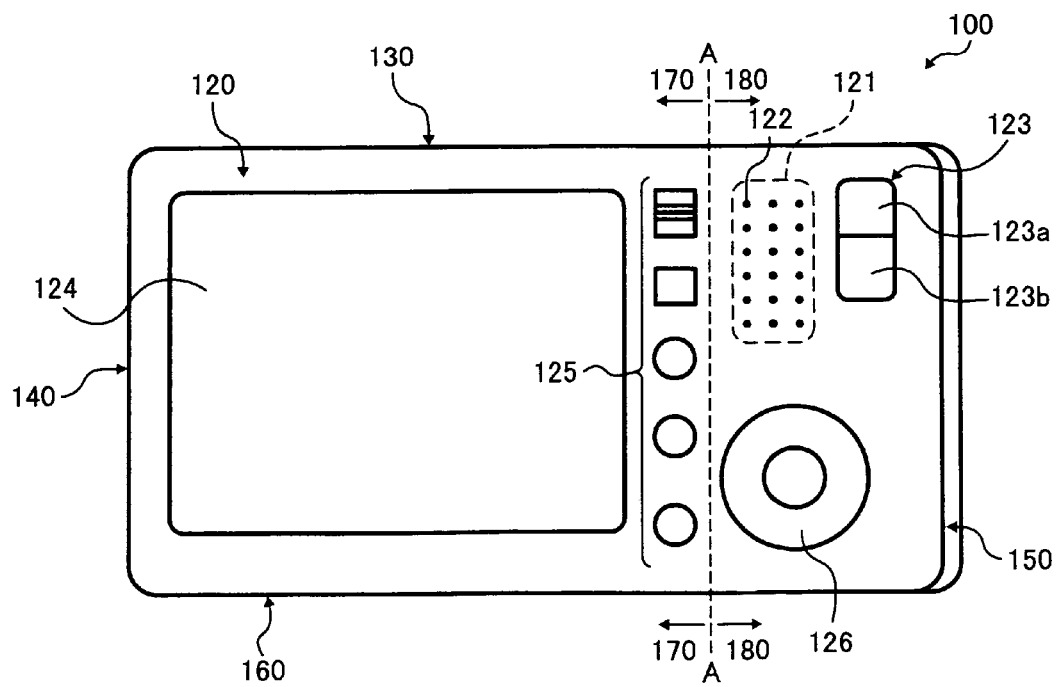
FIG. 2 is a rear view of the camera according to the preferred embodiment of the present invention.
Figure 3:
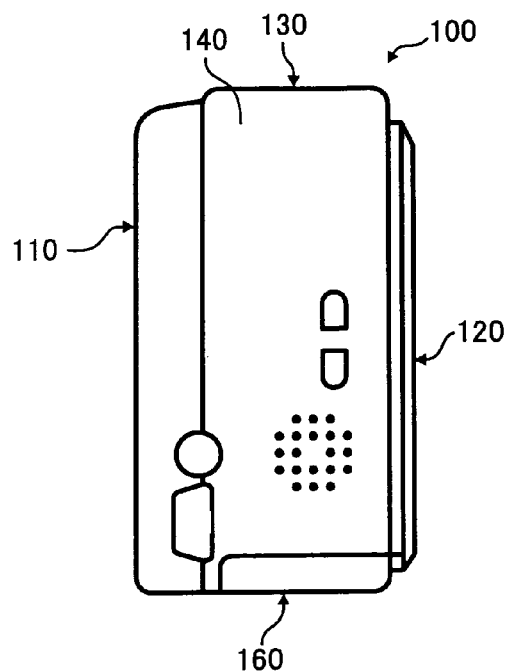
FIG. 3 is a left side view of the camera according to the preferred embodiment of the present invention.
Figure 4:
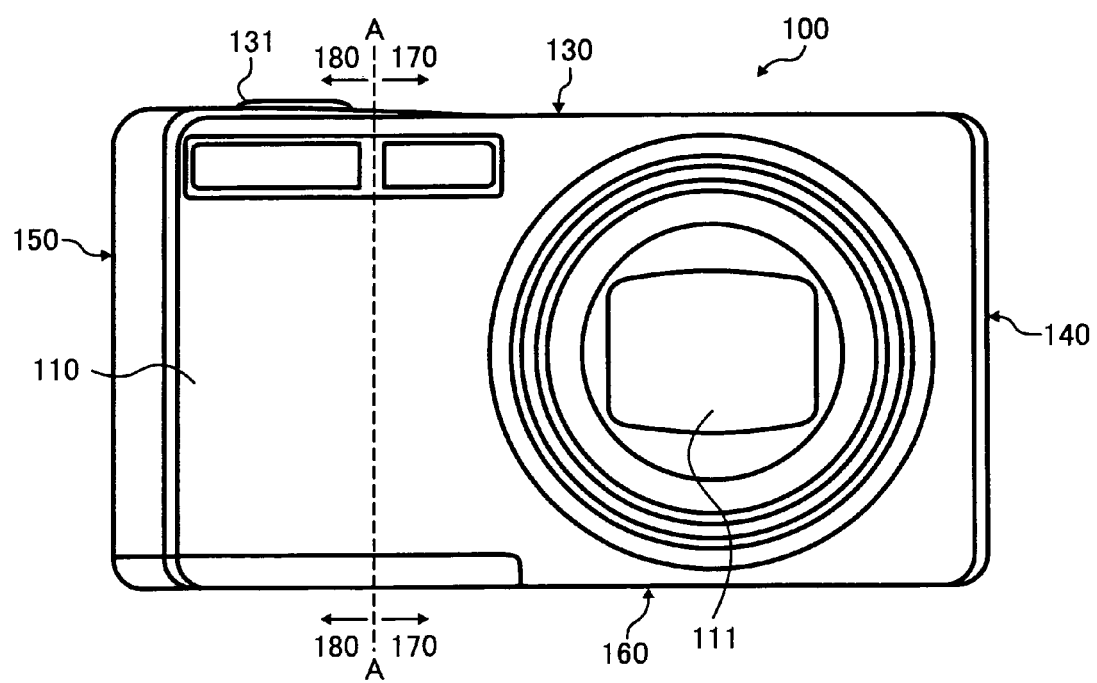
FIG. 4 is a front view of the camera according to the preferred embodiment of the present invention.
Figure 5:
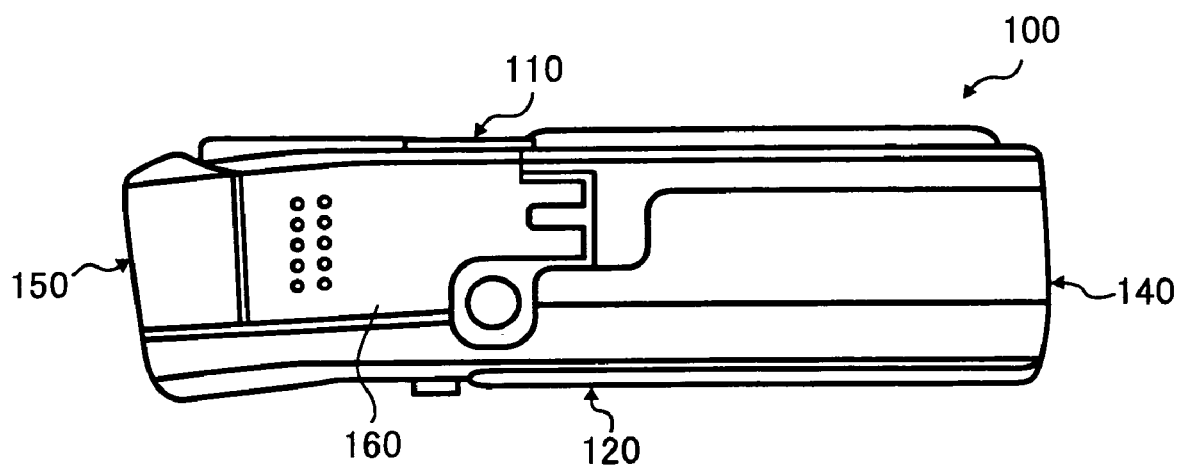
FIG. 5 is a bottom view of the camera according to the preferred embodiment of the present invention.

As shown in FIGS. 1, 2 and 4, the digital camera 100 of the present invention includes a solid rectangular body having a front surface 110 provided with a lens 111, a back surface 120 provided with a liquid crystal display monitor 124, an upper surface 130 provided with a shutter release button 131, a left side surface 140, a right side surface 150 and a bottom surface 160 in a reduced size order of width, high, thickness. In the present embodiment, the digital camera 100 is generally divided into a base section 170 (left side of an A-A line in FIG. 1 and FIG. 2, right side in FIG. 4) provided with the lens 111 and the liquid crystal display monitor 124; and a grip section 180 (right side of the A-A line in FIG. 1 and FIG. 2, left side in FIG. 4).

The base section 170 of the digital camera 100 is formed vertical to an optical axis of the lens 111 and parallel to the imaging element. As shown in FIG. 1, the grip section 180 is provided with a curved surface bending toward the back surface of the body with an angle θ only (e.g. about 8 degrees) formed between an extended line (L0) of the base section 170 and extended lines (L1, L2) of the grip section 180, respectively. The curved surface is formed smoothly and continuously with respect to the base section 170.

As shown in FIG. 1, the upper surface 130 is provided with the shutter release button 131 and a power switch 132. The shutter release button 131 includes a straight anterior edge section 131a and a straight posterior edge section 131b, extending (straight lines L3 and L4 in FIG. 1) along a bending direction of the curved surface of the grip section 180. Since the straight anterior edge section 131a and the straight posterior edge section 131b of the shutter release button 131 are disposed with an obliquity angle, therefore a forefinger is naturally guided to the shutter release button 131 when holding the digital camera 100.

Furthermore, as shown in FIG. 2, the back surface 120 of the base section 170 is provided with the liquid crystal display monitor 124 and a back surface of the grip section 180 includes at an upper position a slip-proof section 121 for preventing slipping disposed in a portion contacted by a thumb finger when gripping the camera, various operation switches 125 and a direction cross key 126. In the present embodiment, the slip-proof section 121 includes a plurality of small projecting portions 122 arranged in a matrix to form a rectangle with a longer vertical length. Thus, by providing the slip-proof section 121 at the upper position of the back surface of the grip section 180, an operator may certainly recognize the portion contacted by the thumb finger and hold the digital camera 100 without slipping because of the small projecting portions 122. However, the slip-proof section 121 is not limited to have the projecting portions disposed thereon; it is also preferred to dispose thereon a friction member etc by other methods.

In the present embodiment, a zoom key 123 for changing a focal length of the lens 111 is disposed outside the slip-proof section 121. The zoom key 123 is adjacent to the slip-proof section 121, including a see-saw switch formed from two longitudinally aligned operation buttons 123a and 123b. Since the operation buttons 123a and 123b of the zoom key 123 is provided longitudinally, therefore it is not only possible to dispose the zoom key 123 with good operability in the grip section 180 relatively narrowed from disposing the liquid crystal display monitor 124 in a larger size, but also possible for the thumb finger to perform zoom operations by shifting laterally the thumb finger only without a need to bring back the thumb finger from the slip-proof section 121 when gripping the camera.

As shown in FIG. 1, in the present embodiment the digital camera 100 is provided with a planar printed-circuit board 190 mounted with electronic elements. The planar printed-circuit board 190 is disposed along the bending direction of the grip section 180. As a result, a capability available for mounting other parts inside the grip section 180 may be improved.

According the above mentioned embodiment, it is possible to provide a camera to be gripped with good stability despite its small size and simple design.

What is claimed is:

1. A camera, comprising:
a body including a base section and a grip section provided on at least one lateral end of the base section, wherein the grip section is bent to a rear side of the camera;
a slip-proof section to prevent finger slipping disposed on a back surface of the grip section; and
a planar circuit board disposed in the body, extending along a bending direction of the grip section.

2. The camera according to claim 1, wherein the body has a rectangular shape including a front surface which is substantially parallel to an imaging surface of a photographing lens disposed thereon, a back surface which is substantially parallel to the front surface and disposed with an image-displaying monitor, and an upper surface disposed with a shutter release button.

3. The camera according to claim 2, wherein the shutter release button includes at least one of a straight anterior edge section and a straight posterior edge section, which are disposed to extend along the bending direction of the grip section.

4. The camera according to claim 1, wherein the slip-proof section is disposed on an upper portion of the back surface of the grip section.

5. The camera according to claim 1, wherein the slip-proof section is configured to have a plurality of projecting portions disposed on a back surface thereof.

6. The camera according to claim 1, wherein the slip-proof section is configured to have a rectangle shape with a longer vertical length.

7. The camera according to claim 1, wherein the back surface of the grip section is provided with a zoom key operated through at least one operation unit which is longitudinally disposed for changing a focal length of a lens.

8. The camera according to claim 7, wherein the zoom key is disposed adjacent to the slip-proof section.

9. The camera according to claim 7, wherein the zoom key is disposed outside the slip-proof section.

10. The camera according to claim 1, wherein the slip-proof section is disposed entirely on an upper portion of the back surface of the grip section.

\* \* \* \* \*